United States Patent
Chou

(10) Patent No.: US 7,232,481 B1
(45) Date of Patent: Jun. 19, 2007

(54) METHOD TO PRODUCE AN ANTI-SWELLING MICA

(76) Inventor: Ming-Hui Chou, No. 515, Nanshang Rd., Gueishan Hsiang, Taoyuan Hsien (TW)

(*) Notice: Subject to any disclaimer, the term of this patent is extended or adjusted under 35 U.S.C. 154(b) by 0 days.

(21) Appl. No.: 11/416,776

(22) Filed: May 3, 2006

(51) Int. Cl.
C04B 14/20 (2006.01)
C01B 33/26 (2006.01)

(52) U.S. Cl. .................... 106/417; 423/328.2

(58) Field of Classification Search ........... 106/417; 208/143; 423/239.1, 326, 328.3; 501/3; 502/63
See application file for complete search history.

(56) References Cited

U.S. PATENT DOCUMENTS

| 4,624,933 | A | * | 11/1986 | Beall et al. | 501/3 |
| 4,828,726 | A | * | 5/1989 | Himes et al. | 507/240 |
| 6,300,269 | B1 | * | 10/2001 | Poncelet et al. | 502/63 |
| 2004/0209090 | A1 | * | 10/2004 | Iwanaga | 428/447 |

FOREIGN PATENT DOCUMENTS

TW 460427 8/2005

* cited by examiner

Primary Examiner—David R. Sample
Assistant Examiner—Abraham M. Matthews
(74) Attorney, Agent, or Firm—Alan Kamrath; Kamrath & Associates PA

(57) ABSTRACT

A method to produce an anti-swelling mica having following steps:
mixing powdery mica with an alkaline compound to form a mixture;
heating the mixture at a temperature between 150° C.~230° C. for lasting 30 minutes to make metal ions out of the alkaline compound to diffuse into the mica homogeneously;
using water to reduce temperature of the mixture so as to form an alkaline solution;
separating the powdery mica from the alkaline solution to obtain a solid mica;
neutralizing excessive alkaline compound adhering to the solid mica by an acid solution that is diluted by cold water and the mica anti-swells after adjusting pH of the solid mica to less than 7.0; and
diluting the acid solution again by adding water and separating the solid mica from diluted acid solution to obtain a production—anti-swelling mica.

13 Claims, 1 Drawing Sheet

METHOD TO PRODUCE AN ANTI-SWELLING MICA

BACKGROUND OF THE INVENTION

1. Field of Invention

The present invention relates to a method to produce an anti-swelling mica, and more particularly to a method to produce the anti-swelling mica in acid to decrease a production cost.

2. Description of the Related Art

A nanocomposite produced by an aluminosillicate ($3Al_2O_3 \cdot 3SiO_2$) such as clay minerals (montmorillonite) and a mica is a common technique. Generally, the mica is swelling, but a swelling mica is not practical. The swelling mica is only used as a packing material in semiconductor industry. Therefore how to transfer the swelling mica to an anti-swelling mica is an important objective in material industry.

To produce the anti-swelling mica, someone used a grind assistant to grind a sericite (a kind of mica) mechanically to form a sericite powder. The grind assistant can be lithium nitrate ($LiNO_3$), sodium nitrate ($NaNO_3$), potassium nitrate ($KNO_3$) and rubidium nitrate ($RbNO_3$) and the alkaline compound has alkaline ions. The sericite has potassium ions and a crystal structure. The mica has a surface area increasing after grinding the sericite to form a sericite powder. The potassium ions are out of the sericite and the alkaline ions diffuse into sericite to take place the potassium ions. According to the said research, the amount of potassium ions of the sericite is related to a specific area of the sericite. The crystal structure will be destroyed after grinding, so that the potassium ion proceeds an ion exchange step with the grind assistant. The result from the research also indicates the rubidium nitrate ($RbNO_3$) is the best grind assistant.

R.O.C Pat. No. 460427 discloses a method about how to produce the anti-swelling mica. Generally, the inventor used the sericite powder grinding by grind assistant, lithium nitrate ($LiNO_3$), to proceed the ion exchange step to produce the anti-swelling mica.

However, the research above both disclosed the grind assistant is neutral. Take the R.O.C patent for example, when proceeding the ion exchange step, the inventor further took a heating step having an operational temperature and a heating time. When the lithium nitrate ($LiNO_3$) proceeds the ion exchange step, the operational temperature reaches 260° C. to 420° C. The first embodiment in the patent discloses the heating time takes 40 hours and the second embodiment discloses the heating time respectively takes 16, 40 and 96 hours. Although the method produces the anti-swelling mica, it needs too much energy and takes too much time to heat. Consequently, the method spends too much energy and money. Furthermore, the lithium nitrate ($LiNO_3$) is expensive, which increases the production cost of the method. If there were a method to produce the anti-swelling mica without spending too many production costs, the anti-swelling mica would be much available on the market.

To overcome the shortcomings, the present invention provides a method to produce an anti-swelling mica to mitigate or obviate the aforementioned drawbacks.

SUMMARY OF THE INVENTION

The primary objective of the present invention is to provide a method to produce an anti-swelling mica in acid to decrease a production cost and increase market competitiveness of the anti-swelling mica.

To achieve the objective, the method to produce an anti-swelling mica having following steps:

mixing powdery mica with an alkaline compound to form a mixture;

heating the mixture at a temperature between 150° C.~230° C. for lasting 30 minutes to make alkaline ions out of the alkaline compound to diffuse into the mica homogeneously;

using water to reduce temperature of the mixture so as to form an alkaline solution;

separating the powdery mica from the alkaline solution to obtain a solid mica;

neutralizing excessive alkaline compound adhering to the solid mica by an acid solution that is diluted by cold water and the mica anti-swells after adjusting pH of the solid mica to less than 7.0; and diluting the acid solution again by adding water and separating the solid mica from diluted acid solution to obtain a production—anti-swelling mica.

Other objectives, advantages and novel features of the invention will become more apparent from the following detailed description when taken in conjunction with the accompanying drawings.

DETAILED DESCRIPTION OF THE INVENTION

Figure 1:
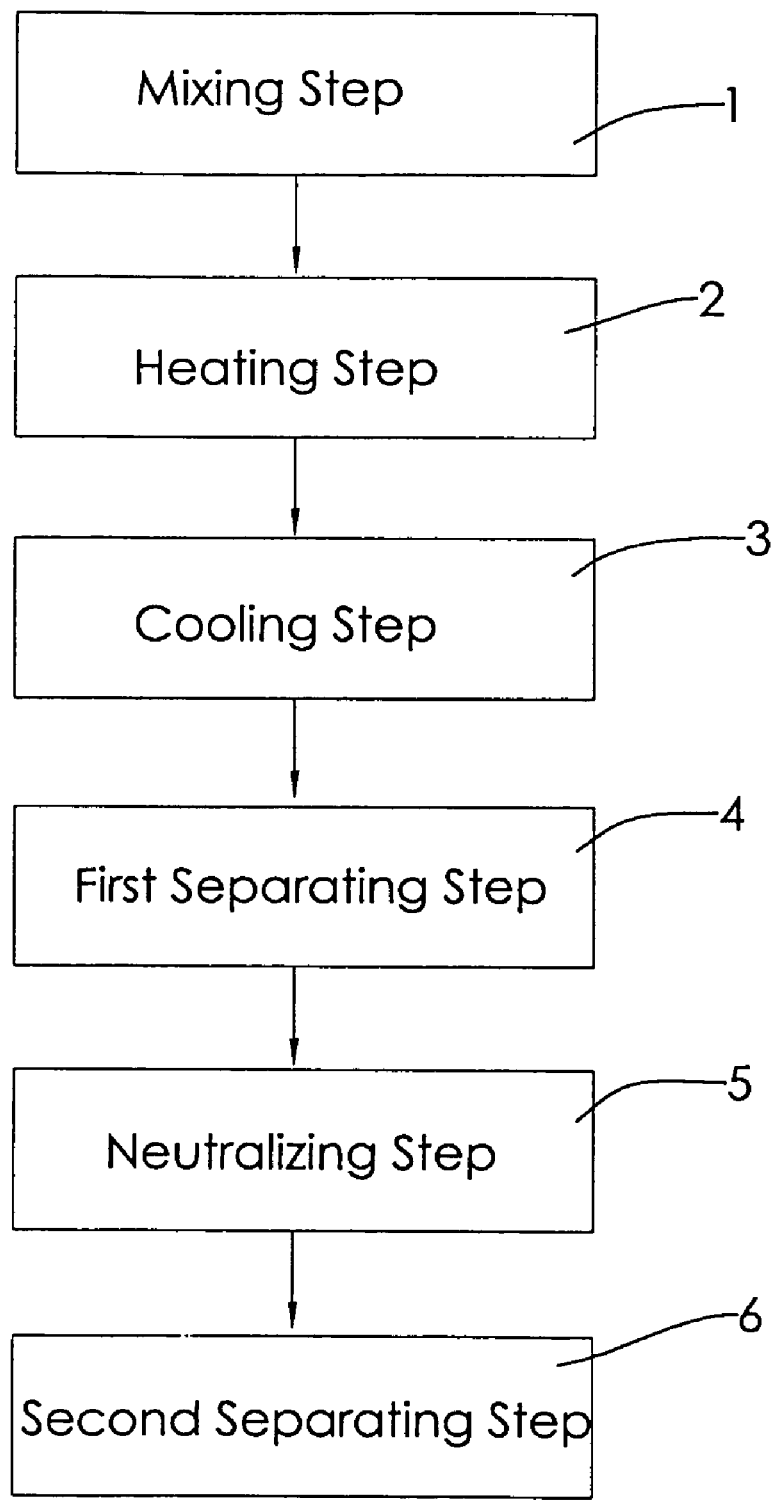
FIG. 1 is a procedure block diagram of a method to produce an anti-swelling mica in accordance with the present invention.

With reference to FIG. 1, a method to produce an anti-swelling mica in accordance with the present invention comprises multiple materials and six steps.

The materials used in the method have a mica that may be a powdery mica, an alkaline compound and an acid solution.

The mica has three layers and two interlayers between the three layers. The mica may be muscovite, golden mica, biotite, fluoromica, sericite, pyrophyllite or the like.

The alkaline compound is selected from the group consisting of lithium hydroxide (LiOH), sodium hydroxide (NaOH), cesium hydroxide (CsOH), barium hydroxide (Ba(OH)$_2$) and the like and has metal ions. The better alkaline compound is sodium hydroxide (NaOH) or lithium hydroxide (LiOH). The best alkaline compound is an alkali mixture of sodium hydroxide (NaOH) and lithium hydroxide (LiOH) and the ratio of the alkali mixture to the alkaline compound is higher than 80 wt %.

The acid solution is selected from the group consisting of sulfuric acid ($H_2SO_4$), hydrochloric acid (HCl), nitric acid ($HNO_3$), acetic acid ($CH_3COOH$), oxalic acid ($HOOCCOOH \cdot 2H_2O$) and the like. The better acid solution is nitric acid ($HNO_3$).

The six steps according to the present method comprise a mixing step (1), a heating step (2), a cooling step (3), a first separating step (4), a neutralizing step (5) and a second separating step (6).

The mixing step (1): the mica that is powdery and the alkaline compound are mixed to form a mixture that has a weight ratio of the powdery mica to the alkaline compound being 1:1~1:20.

The heating step (2): the mixture is heated at temperature between 150° C.~230° C. for lasting 30 minutes to make the metal ions out of the alkaline compound to diffuse homogeneously into the interlayers of the mica.

The cooling step (3): temperature of the mixture is reduced by water so as to form an alkaline solution.

The first separating step (4): the powder mica is separated from the alkaline solution to obtain a solid mica that is powdery and the mica in the alkaline solution has a weight ratio being less than 1 wt %. We may use a hydroextractor or a squeeze filter or the like to separate solid from liquid. The powdery solid mica is washed by water and then the solid mica is separated from water.

The neutralizing step (5): the excessive alkaline compound adhering to the solid mica is neutralized by the acid solution that is diluted by cold water before. Then the mica anti-swells after adjusting pH of the solid mica to less than 7.0 and the better pH of the solid mica is smaller than 4.0.

The second separating step (6): acid solution is diluted again by water and the solid mica is separated from diluted acid solution to obtain a production—anti-swelling mica that is the solid mica after separating. We may use a hydroextractor or a squeeze filter or the like to separate solid from liquid.

EXAMPLE 1

First, 1 kg of powdery mica, 5 Kg of sodium hydroxide (NaOH) and 1 Kg of lithium hydroxide (LiOH) is mixed homogeneously. Then the mixture is heated at temperature being 220° C. for lasting 30 minutes to melt the sodium hydroxide (NaOH) and make the ions to diffuse into the mica. After 30 minutes, the melted sodium hydroxide (NaOH) is diluted and cooled down the mica by adding 2 liters water at room temperature. Next, the mica is separated from the sodium hydroxide (NaOH) solution by a hydroextractor to form a solid mica. Then about 100 g nitric acid ($HNO_3$) is diluted by cold water and then the diluted nitric acid ($HNO_3$) is added to dilute the alkaline compound adhering to the solid mica and the pH of the solid mica is 7.0 after diluting. The acid solution—nitric acid ($HNO_3$) is diluted by water at room temperature. At the same time, the solid mica anti-swells and then the solid mica is separated from diluted acid solution by the hydroextractor to obtain a production—anti-swelling solid mica, which has a weight being 0.85 Kg.

The method to produce the anti-swelling mica has following advantages. The method does not take too much time to heat at temperature higher than 260° C., so this method will decrease the production cost and increase market competitiveness of the anti-swelling mica.

Although the invention has been explained in relation to its preferred embodiment, many other possible modifications and variations can be made without departing from the spirit and scope of the invention as hereinafter claimed.

What is claimed is:

1. A method to produce an anti-swelling mica, the method comprising steps of:
   a mixing step: mixing powdery mica with an alkaline compound to form a mixture having a weight ratio of the powdery mica to the alkaline compound being 1:1~1:20;
   a heating step: heating the mixture at a temperature between 150° C.~230° C. for lasting 30 minutes to make metal ions out of the alkaline compound to diffuse into the mica homogeneously;
   a cooling step: using water to reduce temperature of the mixture so as to form an alkaline solution;
   a first separating step: separating the powdery mica from the alkaline solution to obtain a solid mica;
   a neutralizing step: neutralizing residual alkaline compound adhering to the solid mica by an acid solution that is diluted by cold water before and then the mica anti-swells after adjusting pH of the solid mica to less than 7.0; and
   a second separating step: diluting the acid solution again by water and separating the solid mica from diluted acid to obtain a production—anti-swelling mica.

2. The method to produce the anti-swelling mica as claimed in claim 1, wherein the alkaline compound is selected from the group consisting of lithium hydroxide (LiOH), sodium hydroxide (NaOH), cesium hydroxide (CsOH) and barium hydroxide ($Ba(OH)_2$).

3. The method to produce the anti-swelling mica as claimed in claim 2, wherein the alkaline compound is a alkali mixture of sodium hydroxide (NaOH) and lithium hydroxide (LiOH) and the ratio of the alkali mixture to the total alkaline is higher than 80 wt %.

4. The method to produce the anti-swelling mica as claimed in claim 1, wherein the acid solution selected from the group consisting of sulfuric acid ($H_2SO_4$), hydrochloric acid (HCl), nitric acid ($HNO_3$), acetic acid ($CH_3COOH$) and oxalic acid ($HOOCCOOH.2H_2O$).

5. The method to produce the anti-swelling mica as claimed in claim 1, wherein a extractor is utilize to separate the solid mica from solution in the first separating step and the second separating step.

6. The method to produce the anti-swelling mica as claimed in claim 1, wherein pH of the solid mica of the neutralized step adjust to less than 7.0 and the better pH of the solid mica is smaller than 4.0.

7. The method to produce the anti-swelling mica as claimed in claim 1, wherein a squeeze filter is utilize to separate the solid mica from solution in the first separating step and the second separating step.

8. The method to produce the anti-swelling mica as claimed in claim 1, wherein the mica is muscovite.

9. The method to produce the anti-swelling mica as claimed in claim 1, wherein the mica is golden mica.

10. The method to produce the anti-swelling mica as claimed in claim 1, wherein the mica is biotite.

11. The method to produce the anti-swelling mica as claimed in claim 1, wherein the mica is fluoromica.

12. The method to produce the anti-swelling mica as claimed in claim 1, wherein the mica is sericite.

13. The method to produce the anti-swelling mica as claimed in claim 1, wherein the mica is pyrophyllite.

* * * * *